(12) United States Patent
Ayoub

(10) Patent No.: US 6,505,935 B2
(45) Date of Patent: Jan. 14, 2003

(54) OPTICAL LENS COATING AND METHOD

(76) Inventor: Abby Ayoub, 14-13 28th St., North Bergen, NJ (US) 07047

( * ) Notice: Subject to any disclaimer, the term of this patent is extended or adjusted under 35 U.S.C. 154(b) by 0 days.

(21) Appl. No.: 09/843,853

(22) Filed: Apr. 30, 2001

(65) Prior Publication Data

US 2002/0008847 A1 Jan. 24, 2002

Related U.S. Application Data

(63) Continuation of application No. 09/621,223, filed on Jul. 21, 2000.

(51) Int. Cl.[7] .................................................. G02C 7/02
(52) U.S. Cl. .......................... 351/177; 351/44; 351/163
(58) Field of Search ........................ 351/177, 162–163, 351/159, 41, 44–45

(56) References Cited

U.S. PATENT DOCUMENTS

| RE36,049 E | * | 1/1999 | Kamekura et al. .......... 351/163 |
| 6,079,827 A | * | 6/2000 | Coleman et al. ............ 351/177 |
| 6,145,984 A | * | 11/2000 | Farwig ........................ 351/49 |
| 6,228,289 B1 | * | 5/2001 | Powers et al. ............. 264/1.36 |

* cited by examiner

*Primary Examiner*—Jordan M. Schwartz
(74) *Attorney, Agent, or Firm*—Greenberg Traurig; Adam Landa; Richard E. Kurtz, II

(57) ABSTRACT

An optical lens having a colored coating affixed to the edge of the lens. The apparatus may enhance the cosmetic appearance of eyeglasses by reducing the appearance of the white ring appearing along the perimeter of the face of lens when viewing eyeglasses from the front, and by reducing the appearance of the white film on the edge of lenses when viewing eyeglasses from the side. The apparatus may also reduce the glare of the optical lens from light entering through the edge of the lens.

24 Claims, 2 Drawing Sheets

OPTICAL LENS COATING AND METHOD

CROSS REFERENCE TO RELATED APPLICATIONS

This application is a continuation-in-part of application Ser. No. 09/621,223 filed Jul. 21, 2000, which is incorporated herein in its entirety by reference.

BACKGROUND

1. Field of the Invention

The invention relates to optical lens coatings, in particular the application of a coating to an optical lens used in eyeglasses.

2. Description of Related Art

Eyeglass lenses set in frames have aesthetic problems. Often the lens is thicker than the frame, and the edge of the lens has a noticeable white film. Viewing eyeglasses from the side, the edge of the lens can extend beyond the edge of the frame, thus making the eyeglasses less cosmetically appealing because the white filmy edge contrasts with the color of the frame.

One solution is to polish the edge of the lens to eliminate the white film Polishing is often used with rimless frames. However, polishing the edge of a lens used in a frame other than a rimless frame can make the edge of the lens stand out even more. Further, polishing the edge of the lens can allow more light to enter the lens from the side, thereby increasing the glare to the wearer's eye.

Eyeglass lenses are often sold in the form of blanks in a particular prescription. Furthermore, non-prescription lenses may be utilized. They may be made of several materials including glass, plastic, polycarbonate and different types of high index. Lens blanks may come with certain added layers of material already applied. For instance, lens blanks may have a scratch resistant coating, a UV filter layer, a tint layer, an anti-glare coating and sometimes a hydrophobic coating. Additionally, other layers such as mirror coatings are sometimes used. If a lens blank is obtained with an anti-glare coating or hydrophobic coating already applied, it cannot be tinted.

SUMMARY

It would be desirable to have a technique to enhance the cosmetic appearance of eyeglasses by reducing the appearance of the white film on the edge of an optical lens and reducing the appearance of the white ring appearing along the perimeter of the face of an optical lens.

By applying a colored coating to the edge of an optical lens, the cosmetic appearance of eyeglasses may be enhanced by reducing the appearance of the white film on the edge of an optical lens and by reducing the appearance of the white ring along the perimeter of the face of an optical lens, and the glare of the optical lens produced by light entering through the edge of the lens may be reduced.

It is to be understood that both the foregoing general description and the following detailed description are exemplary and explanatory and are intended to provide further explanation of the invention as claimed.

DETAILED DESCRIPTION OF EMBODIMENTS

Many people with strong eyeglass prescriptions avoid wearing glasses because their lenses are thicker than the frame in which the lenses sit. Such lenses are quite noticeable because the white film that appears on the edge of the lens contrasts with the color of the eyeglass frame. One embodiment of the invention is directed to enhancing the cosmetic appearance of eyeglasses by reducing the appearance of this white film that appears on the edge of the lens applying a colored coating to the edge of the lens, the colored coating matching the color of the frame into which the lens will sit.

The fashion industry has avoided using eyeglasses in photo shoots because of reflections in the lenses. When a particular photo requires the model to wear glasses, the lenses of the frames are traditionally removed for a number of reasons. One reason the fashion industry removes the lenses is because of the glare from light reflecting off the surface of the lens. Anti-glare coating can reduce the amount of the light that reflects off the surface of the lens. However, there is also a white ring that appears along the perimeter of the face of the lens due to light entering through the edge of the lens. The edge of the lens allows light to pass through it which creates the appearance of the white ring around the perimeter of the face of the lens. This ring appearing along the perimeter of the lens face is visible to both the eyeglass wearer and others.

In a first embodiment, an opaque colored coating is applied to the edge of the lens to reduce the amount of light passing through the edge of the lens, thereby reducing the appearance of the white ring otherwise appearing along the perimeter of the lens face.

In a second embodiment, a colored coating is chosen that contrasts with the color of the frame, giving the eyeglass wearer an additional fashion choice yet still providing the benefits of reducing the appearance of the white ring appearing along the perimeter of the lens face.

In a third embodiment, a translucent colored coating is applied to the edge of the lens to allow some light to pass through, giving the lens a colored hue while still achieving the beneficial results.

Figure 1:
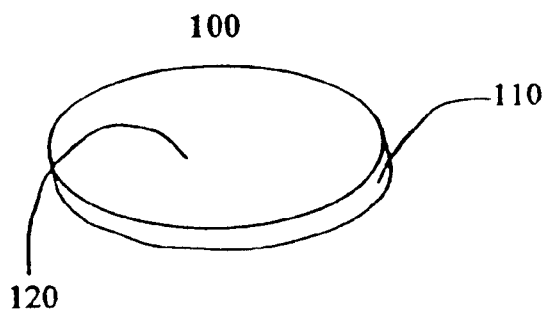
FIG. 1 is a three-dimensional drawing of an eyeglass lens.

The first embodiment will now be discussed with reference to FIGS. 1, 2a and 2b. This embodiment addresses the problems caused by the white film on the edge of the lens. FIG. 1 is a three-dimensional drawing of eyeglass lens 100 having edge 110 and face 120.

Figure 2A:
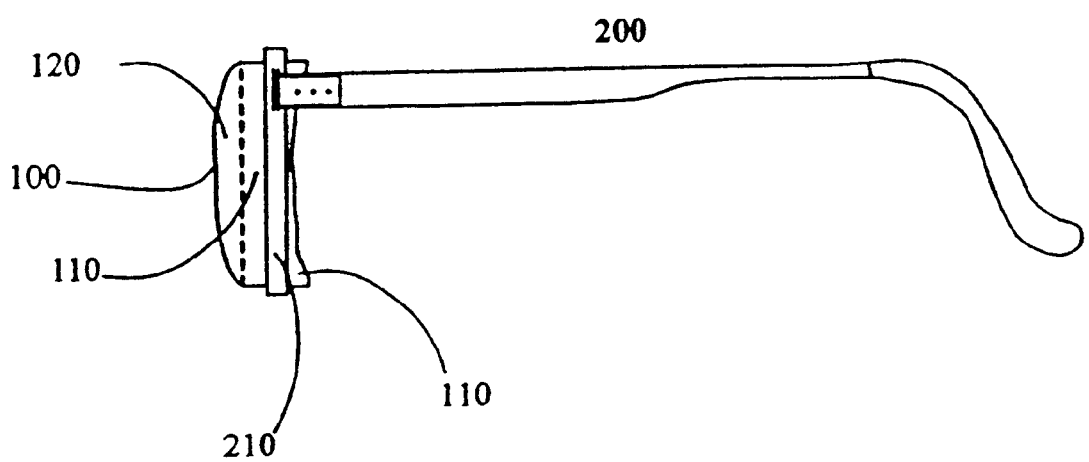
FIG. 2a is a side view of eyeglasses having a lens in a frame.

FIG. 2a is a side view of eyeglasses 200 having lens 100 sitting in frame 210. Lens 100 is shown with edge 110 and face 120. Lens 100 is thicker than frame 210, as shown by lens edge 110 extending beyond the borders of frame 210. In one embodiment, a colored coating is applied to lens edge 110. The color of the coating matches the color of frame 210 into which lens 100 will be inserted. By coloring edge 110 of lens 100 to match the color of frame 210, lens edge 110 cosmetically blends in with frame 210 making lens edge 110 much less noticeable from the side.

Figure 2B:
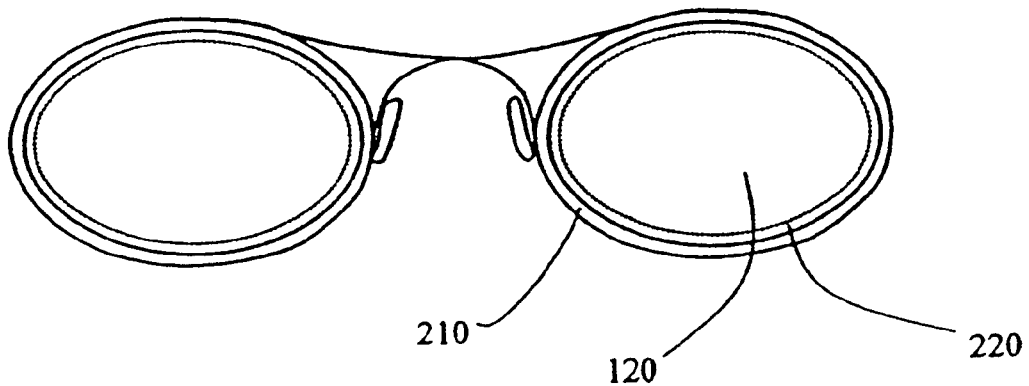
FIG. 2b is a front view of eyeglasses.

FIG. 2b is a front view of eyeglasses 200. Frame 210 has a lens having face 120. White ring 220 on lens face 120 encircles the perimeter of lens face 120 when light passes through lens edge 110 (shown in FIG. 2a). In this embodiment, applying an opaque coating to lens edge 110 (shown in FIG. 2a) blocks light from entering through lens edge 110, which reduces or eliminates the appearance of white ring 220 on lens face 120. Cosmetically, lens face 120 now appears to extend all the way to frame 210 without the appearance of white ring 220 running along the perimeter of lens face 120.

The second embodiment will now be described with reference to FIGS. 1, 2a and 2b. In this embodiment, an opaque colored coating is applied to lens edge 110 that does not match the color of frame 210. This unmatched color enables lens edge 110 to cosmetically contrast with the color of frame 210. The contrasting opaque colored coating in this embodiment still blocks light from entering lens edge 110 thereby reducing the appearance of white ring 220.

The third embodiment will now be described with reference to FIGS. 1, 2a and 2b. In this embodiment, a translucent colored coating is applied to lens edge 110. Such a translucent color allows some light to enter lens 100 through lens edge 110. When lens 100 having a translucent colored coating on lens edge 110 is place in frame 200 and viewed from the front of glasses 200, lens face 120 takes on the hue of the translucent colored coating.

One embodiment of the colored coating comprises a commercially available acrylic enamel paint or a commercially available fingernail enamel. The color of the coating may be custom mixed to match each frame style and color. Alternatively, the color can be chosen by the customer, as can whether the coating will be opaque or translucent. Optical lens scratch-coating can optionally be added to the colored coating mix which adds strength to the coating. Alternatively, a spectrum of different color enamels may be provided and a match obtained by a user picking a relatively close match by personal judgment from the colors or a reference chart. In another alternative, the choice of colors of the spectrum provided may be related to a brand of frames and may include additives such as in metallic colors. Furthermore, an alternative embodiment may utilize multiple brush passes to apply a gradual shading of colors in a progression along the edge from the front lens edge to the back lens edge or any portion therein.

In an alternative embodiment, the color may be related to the skin tone of the user or related to a wardrobe choice. Several examples are presented for illustration and not to be considered limiting. Certain frames do not completely encase the edge of a lens. For example, a frame type available is known as a 3 piece drill mount. Holes in the lenses are used to secure the lenses to the frame pieces rather than a typical bevel. Similarly, a rimless frame, also known as a frameless frame are commonly constructed using a transparent flexible wire running in a groove of the lens to support each lens rather than the traditional bevel. In such cases, a natural skin tone lens edge coating may be desirable to substantially match a users skin tone. The color of skin tone may also be chosen from a supplied array of coatings such as enamels and alternatively, may be custom mixed.

Furthermore, frames including rimless frames and 3 piece drill mount frames may be interchangeable such that the lens coatings described may need to be changed. This may also be the case if a person learns that they had an original color chart analysis that was not accurate and after obtaining a revised color chart, decided to overhaul a wardrobe, including frame colors.

In another embodiment, lenses such as mirror coated lenses or sunglass tinted lenses have color. In such a case, the lens coating color may be chosen to substantially match the frame color or the lens color. Alternatively the color could blend from the lens color to a frame color.

In another embodiment, lenses such as polarized lenses, including those with and without prescription lenses may have a polarized film coating. They may have a hydrophobic coating. Such lenses may be detrimentally affected by a cut edge. Accordingly, such edge may be coated.

In another embodiment, lenses such as photochromatics (variable-tint or transition lenses) and tints have color. In such a case, the lens coating color may be chosen to vary from the edge on one side of the lens such as the bottom to the edge on another side of the lens such as the top.

In an alternate embodiment, the color of the coating is matched to the color of the frame using a color matching computer system which determines the amounts of different paints to mix together to match the color of a frame placed under its sensor. Many bench mounted or handheld spectrophotometers are available commercially, including those marketed by Minolta, including the CM-3200d and the MatchRite® color matching system. Such a sensor may be used in a manual process, or may be used as part of an automated lens edge coating process. Furthermore, frame color information may be stored in a database and used to manually or automatically pick appropriate colors. Similarly, colored lenses may be scanned by a spectrophotometer and even a range of colors distinguished in the case of gradual color change. In the case of colored lenses, at least one reading from each of the lens and frame may be used.

In another embodiment, the color matching system may include an automated color mixing machine such as those used in paint stores including the Monimatic Studio. Preferably the system would operate on a scale commensurate with the amount of coating needed. The lens coating material is preferably nail polish, such as that available from Mirage®. However, the coating may include any appropriate coating including paints that usually consist of pigments, binders, solvents and optionally effect additives such as metallic flakes and property additives such as those that may improve application or shelf life properties. The lens edge coating may also include permanent marker substances that may be generally available in a wide range of colors. Many permanent markers may be removed with alcohol.

Figure 3:
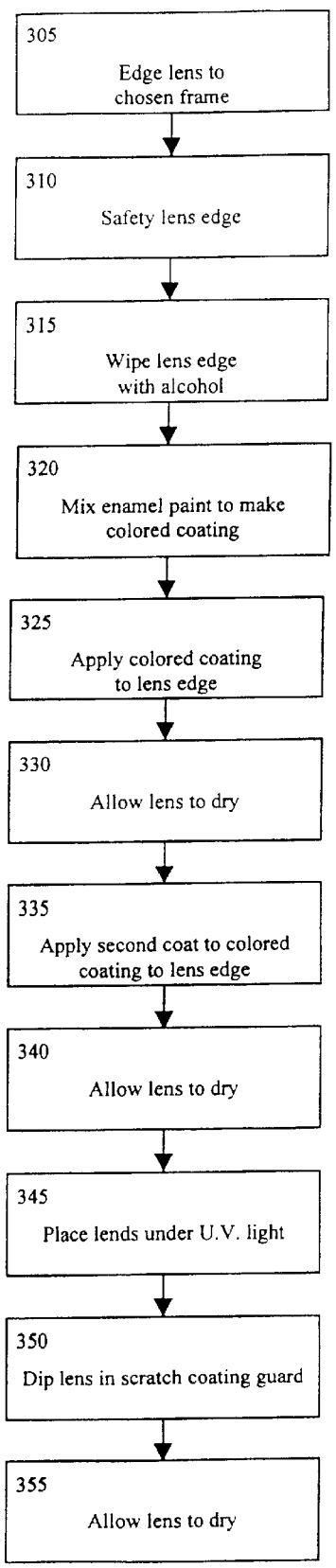
FIG. 3 is a flow chart illustrating a method by which a coating may be applied to a lens.

One embodiment of a method of applying the coating to a lens will now be described with reference to FIG. 3. First, the lens is "edged" to the chosen frame, meaning it is cut to fit a particular frame (Step 305). Next, the lens is "saftied", meaning the sharp edge of the lens is removed so it doesn't pose a hazard to the wearer (Step 310). The lens is then wiped down with alcohol to ensure it is clean (Step 315). Enamel paint is then mixed to create the desired color of the coating (Step 320). The colored coating is then applied to the lens edge 110 using a paint brush or other paint applicator (Step 325). The lens is then allowed to dry (Step 330). An optional second coat of the colored coating is then applied to lens edge 110, and the lens is again allowed to dry (Steps 335 and 340). Any excess colored coating that may have spilled onto face 120 of the lens is removed using commercially available paint thinner which may be acetone-based or non-acetone-based. The lens is then placed under an ultraviolet light to help the colored coating to dry (Step 345). Alternatively, the lens may be placed in a hot air blower or a frame warmer. The lens is then dipped in scratch-guard coating to help prevent the colored coating from chipping (Step 350). Alternatively, the scratch-guard coating may be added to the colored coating when the colored coating is mixed in Step 320. Finally, the lens is again allowed to dry (Step 355).

It is to be understood that that the embodiments do not require applying the colored coating to the entire edge of an optical lens. For example, with reference to eyeglasses 200 in FIG. 2a in an alternate embodiment, the colored coating is applied only to that portion of edge 110 of lens 100 not covered by frame 210.

In a preferred embodiment, a nail polish is applied by hand as the lens coating. After drying, the nail polish may be removed with commonly available nail polish remover such as acetone. However, of excess coating is applied to the hydrophobic coated lens front and back, it may be easily removed using alcohol. As described above, multiple coats may be used and post processing such as UV exposure or baking may be utilized.

In an additional embodiment, a first coating is applied to the lens blank front and back. The first lens coating may be a sacrificial coating. The first coating is preferably a coating that the lens edge coating will not adhere to. Alternatively, it is a coating that will dissolve in a substance that will not harm the frame, lens (or other coatings) and the lens coating (preferably nail polish). Alternatively it is a coating that will make excess lens edge coating more easily removed from the lens front and back than the coating on the lens edge. After the lens is cut and safety edged (if required) the lens edge coating is applied. Thereafter, the solvent is utilized to remove the sacrificial coating and any excess lens edge coating.

Alternatively, a larger safety edge may be utilized to create a large edge on the face such that it may be coated. Such a coating may be utilized to make a frame appear thicker or provide a surface for another color to be applied to for contrast.

In an alternative method, a lens coating is utilized to ease the application of the lens edge coating. For example, a lens blank may be treated on both sides with a hydrophobic coating. Thereafter, the lens may be cut to fit a frame, such that the hydrophobic coating is not on the edge that is cut. A safety edge is often required by law on the edge of a lens. Automatically applied safety edges may be too severe—and take away too much material from the face of the lens 120. Accordingly a hand safety edge (or "safety bevel" that differs from the frame mounting bevel) is preferably applied using an appropriate grinding wheel such that a minimal safety edge that complies with legal requirements is achieved. However, an automatic machine may be used, particularly if the safety edge tolerance is only slightly greater that the size of the required safety edge. Additionally, the edge may be debraised or prepped with alcohol or other appropriate preparation. Thereafter a lens coating may be applied.

In an additional embodiment, an automatic lens edge coating system is provided. Lens handling equipment is well understood as shown by the variety of lens blank cutting machines. An automated machine obtains a desired edge color from a data input or a sensor input. The automated machine then selects an appropriate substantially matching color from an individually provided coating material input or from an available palette of coating materials or by creating a custom mix. The lens blank is appropriately coated as described above. It may be previously coated with a hydrophobic coating or the machine may provide a hydrophobic or other sacrificial coating. The lens blank is then cut and safety edged. The machine then applies the coating using a dip into a vat of paint or a brush or spray applicator. The lens edge coating preferably does not adhere to the top coating of the lens face and back. Thereafter, the lens coating is optionally treated and may be dipped into a cleaning solvent and optionally brushed or wiped clean before or after treatment.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A method of applying a colored coating to a lens having an edge, comprising:
    applying a hydrophobic coating to at least a portion of a front and back portion of a lens;
    cutting the lens and edging the lens;
    applying the colored coating to at least a portion of the edge of the lens, and the hydrophobic coating assisting in;
    removing excess colored coating from the lens.

2. A method of treating a lens having a first surface, a second surface and an edge, comprising the steps of:
    applying a first coating to at least a first portion of the first surface of the lens;
    applying a second coating to at least a portion of the edge of the lens, wherein such at least portion of the edge of the lens is adjacent to at least a portion of the first portion of the first surface of the lens and
    removing the second coating from the first coating.

3. The method of claim 2 wherein the first coating is a hydrophobic coating.

4. The method of claim 3 wherein the second coating is a colored coating.

5. The method of claim 2, further comprising the step of applying a third coating to at least a second portion of the second surface of the lens.

6. The method of claim 5, wherein the first coating and the third coating are hydrophobic coatings, and wherein the second coating is a colored coating.

7. The method of claim 5, further comprising the step of removing the second coating from the third coating.

8. The method of claim 4, wherein the step of removing the second coating from the first coating is performed after the second coating is dry.

9. The method of claim 7, wherein the step of removing the second coating from the third coating is performed after the second coating is dry.

10. The method of claim 4, wherein the second coating is removed from the first coating by applying at least one of the group comprising: acetone, non-acetone and alcohol and water.

11. A method of treating a lens having a first surface and a second surface, comprising the steps of:
    applying a first coating to at least a first portion of the first surface of the lens;
    forming an edge by removing at least a portion of the lens comprising at least a portion of the first portion of the first surface of the lens;
    applying a second coating to at least a second portion of the edge of the lens, wherein such second portion of the edge of the lens is adjacent to at least a portion of the first portion of the first surface of the lens and removing the second coating from the first coating.

12. The method of claim 11, wherein the first coating and a third coating are hydrophobic coatings and the second coating is a colored coating.

13. The method of claim 11, wherein the step of forming is done by grinding the lens.

14. The method of claim 11, wherein the step of forming is done by cutting the lens.

15. The method of claim 11, further comprising the step of applying a third coating to at least a second portion of the second surface of the lens.

16. A method of treating a lens having a first surface and a second surface, comprising the steps of:

applying a hydrophobic coating to the first surface and the second surface of the lens;

forming an edge by removing at least a portion of the lens;

applying a colored coating to at least the edge;

removing the colored coating from the hydrophobic coating.

17. The method of claim 16, wherein the step of applying a hydrophobic coating is performed by dipping the lens in a hydrophobic coating.

18. The method of claim 16, wherein the step of applying a colored coating is performed by dipping the lens in a colored coating.

19. The method of claim 16, wherein the step of applying a hydrophobic coating is performed using a sprayer.

20. The method of claim 16, wherein the step of applying a colored coating is performed using a sprayer.

21. The method of claim 16, wherein the step of forming an edge is performed using a grinder.

22. The method of claim 16, wherein the step of forming an edge is performed using a cutter.

23. The method of claim 16, wherein the step of removing the colored coating is performed using at least one from the group: acetone, non-acetone and alcohol and water.

24. A method of applying a colored coating to a lens having an edge, comprising:

applying a hydrophobic coating to at least a portion of a front and back portion of a lens;

cutting the lens and edging the lens;

subsequent to said step of applying a hydrophobic coating, applying the colored coating to at least a portion of the edge of the lens, and removing excess coating from the lens.

* * * * *